United States Patent [19]

Romano

[11] Patent Number: 5,257,683
[45] Date of Patent: Nov. 2, 1993

[54] BRAKE AND GEAR CHANGE CONTROL UNIT FOR A BICYCLE

[75] Inventor: Antonio Romano, Padova, Italy
[73] Assignee: Campagnolo S.r.l., Vicenza, Italy
[21] Appl. No.: 847,314
[22] Filed: Mar. 6, 1992
[30] Foreign Application Priority Data
   Mar. 11, 1991 [IT] Italy .......................... TO91A000167
[51] Int. Cl.⁵ ...................... B62K 23/06; B62M 25/04
[52] U.S. Cl. ..................... 192/4 R; 74/475; 74/489; 74/502.2
[58] Field of Search ............... 192/4 R; 74/489, 475, 74/502.2

[56] References Cited
U.S. PATENT DOCUMENTS

| 3,478,617 | 11/1969 | Maeda | 74/489 |
| 4,100,820 | 7/1978 | Evett | 74/489 |
| 4,132,296 | 1/1979 | Evett | 192/4 R |
| 4,319,673 | 3/1982 | Kojima | 192/4 R |
| 4,974,469 | 12/1990 | Romano | 74/502.2 |
| 5,052,241 | 10/1991 | Nagano | 74/502.2 |

FOREIGN PATENT DOCUMENTS

| 0067692 | 12/1982 | European Pat. Off. . |
| 371254 | 6/1990 | European Pat. Off. ............. 74/489 |
| 3916919 | 11/1989 | Fed. Rep. of Germany ..... 74/502.2 |
| 2099961 | 12/1982 | United Kingdom . |

Primary Examiner—Richard M. Lorence
Attorney, Agent, or Firm—Sughrue, Mion, Zinn, Macpeak & Seas

[57] ABSTRACT

A combined gear change control and brake unit for a bicycle comprises a first actuating lever adjacent the rear of the brake lever and a second actuating lever projecting horizontally towards the middle of the handlebar, which respectively control ratchet devices for controlling upward or downward selection of the various transmission ratios.

9 Claims, 5 Drawing Sheets

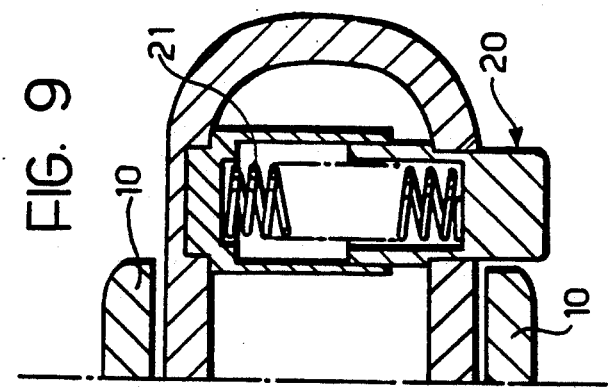
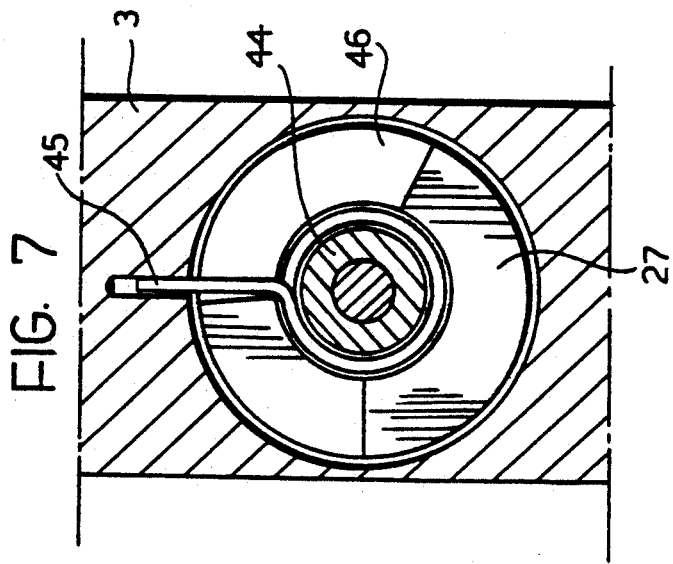
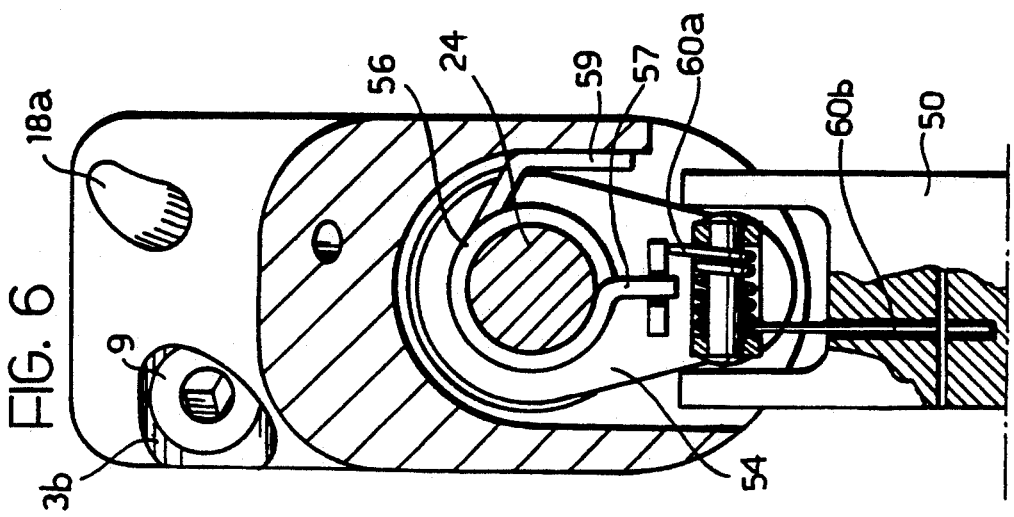

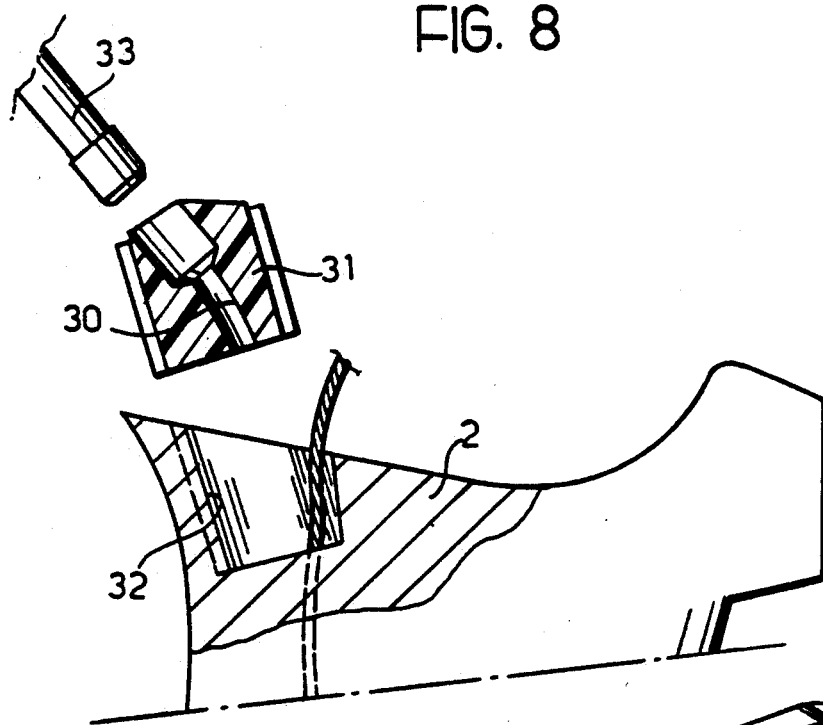
FIG. 8
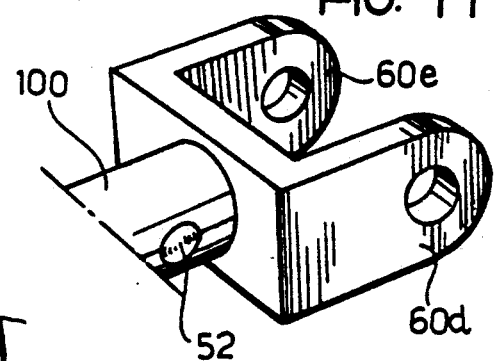
FIG. 11
FIG. 10
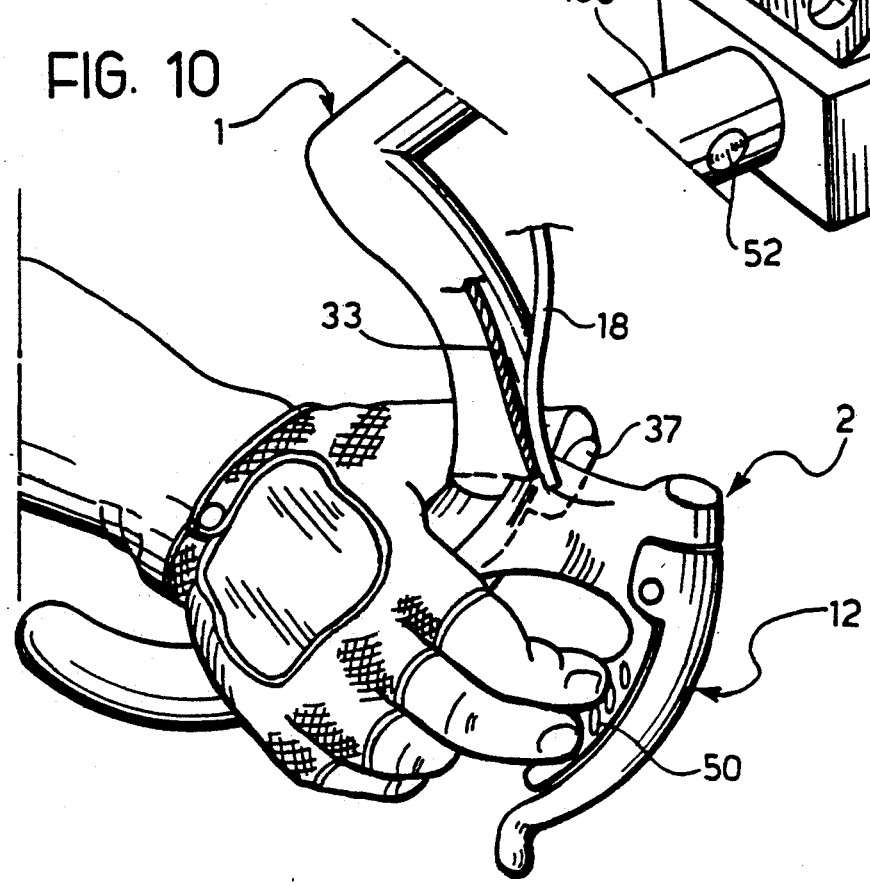

BRAKE AND GEAR CHANGE CONTROL UNIT FOR A BICYCLE

FIELD OF THE INVENTION

The present invention relates to a combined brake and gear change control unit for a bicycle, of the type comprising:

a support body fixable to the bicycle handlebar, a brake control lever pivotally mounted to the support body about a first axis and provided with attachment means for a flexible brake control cable, a gear change control member, rotatably mounted in the support body about a second axis orthogonal to the said first axis and carrying means around which the flexible gear change control cable can be passed, and means for imparting a rotation to the said gear change control member.

PRIOR ART

In recent years there has been an increasing tendency to form combined bicycle brake and gear change control units, which allow the cyclist to actuate both brake and gear change without taking his hands away from the bicycle handlebar. This requirement is particularly felt in the field of competition bicycles where it is desirable that the gear change control operation can be performed rapidly as possible retaining full control of the bicycle so as not to distract the cyclist's attention from the conduct of the competition.

In the past various types of combined gear change control and brake devices have been proposed. One device of the type indicated at the beginning of the present description is for example illustrated in U.S. Pat. Nos. 4,100,820 and 4,132,296.

These documents illustrate a unit in which the gear change control device includes a control lever projecting through a slot in the support body with its inner end within the body mounted rotatably in the support body and around which the flexible gear change control cable is passed. This member is subject to the action of a friction mechanism sufficient to counteract the usual spring which is associated with the gear change dérailleur so as to guarantee that the gear change control lever remains in the selected position.

Such a solution is unsatisfactory, principally for two reasons. First, use of gear change control devices of the indexed type is now established, which allow cyclists to have a secure reference of the various positions of the control lever corresponding to the various selectable transmission ratios. In the second place, the gear change control lever provided in the said known devices is not always movable with ease and convenience by the cyclist. In particular, the actuation can be difficult in one of the two senses of rotation of the lever and when the lever must be actuated starting from some of its various possible operating positions.

Fundamentally, other known devices, such as those illustrated in U.S. Pat. No. 3,478,617, in European Patent Application EP-A-0 352 732 and in German Patent Application DE-A-3 916 919 suffer from the same disadvantages. These latter three documents, among others, illustrate control units in which the brake lever and the gear change control lever are pivotally mounted about parallel axes rather than about orthogonal axes as stated at the beginning of the present description; this involves a difficult movement for the gear change, at least when the control lever must be turned forwardly.

It has been proposed (see European Patent Application EP-A-0 371 254) to provide a combined brake and gear change control unit in which the brake lever which, being turnable about two orthogonal axes can also function as the gear change control lever. This arrangement, however, has disadvantages of requiring the utilisation of a complex mechanism constituted by a large number of parts.

It has also been proposed (see International Patent Application PCT/GB 90/00220) to provide a control unit in which the gear change control lever is a separate lever from the brake lever, but is articulated to the brake lever body. In this case, also, the pivot axis of the gear change control lever is parallel to the pivot axis of the brake lever and the actuation of the gear change is not always easy.

Finally, German Patent Application DE-A-3 136 922 has proposed a gear change control and brake unit in which the gear change control member can be actuated by a separate lever from the brake lever, by means of a ratchet device. The disadvantage of this known device resides first of all in the fact that in this case too the gear change control member is rotatable about an axis parallel to the pivot axis of the brake lever so that actuation is not always easy. In the second place it includes a toothed wheel which functions both as the toothed wheel of the ratchet device and as a reference wheel in cooperation with a ratchet stop pawl for the various operating positions of the gear change, which renders the control device difficult to operate on a practical level.

THE OBJECT OF THE INVENTION

The object of the present invention is that of providing a unit of the type indicated at the beginning of the present description, which will be able to overcome all the above indicated disadvantages and which will have a series of further advantages which will be specified hereinafter.

SUMMARY OF THE INVENTION

With a view to achieving this object, the subject of the invention is a combined gear change and brake unit for a bicycle, of the type initially indicated in the present description, characterised by the fact that the said unit further comprises indexing means in mutual engagement carried by the gear change control member and by the support body, defining a plurality of stable positions of the said control member corresponding to engagement of the various transmission ratios selectable with the gear change, by the fact that the said control member is constituted by a shaft rotatable supported by the support body about the said second axis, and by the fact that the said means for imparting rotation to the gear change control shaft comprise two independent ratchet devices of the said indexing means and associated with two different portions of the gear change control shaft to actuate rotation in one sense or in the other respectively of the said shaft, so as to cause respectively the upward or downward selection of the various transmission ratios, each of the two said ratchet devices including an actuating lever which is biased by resilient means towards a stable rest position and is displaceable against the action of the said resilient means to actuate rotation of the control shaft.

Therefore, in the unit according to the invention, the gear change is controlled by impressing a rotation on one of the two said actuating levers about the axis of the gear change control shaft, which is orthogonal and not parallel, to the pivot axis of the brake lever. This arrangement makes this operation of the gear change particularly easy.

The fact that after each operation of one of the gear change actuating levers this latter returns automatically to a rest position which is chosen in an optimum manner so that it can be reached easily by the cyclist's fingers guarantees the ease of operation in all operating conditions.

In the case of a competition bicycle, where the pivot axis of the brake lever lies horizontally and transversely with respect to the longitudinal direction of the bicycle, the axis of rotation of the gear change control shaft is instead parallel to the longitudinal direction of the bicycle.

Preferably, the two said actuating levers of the ratchet devices, when in their respective rest positions, extend substantially in two orthogonal directions. It can thus be arranged that one of the two levers is positioned in a substantially vertical longitudinal plane, in a condition adjacent the brake control lever so as to be easily operable by means of a lateral pressure, inwardly of the handlebar, exerted by the fingers of one hand, whilst the other actuating lever is directed horizontally towards the middle of the handlebar so as to be easily actuated by means of a vertical pressure exerted downwardly by the thumb (see FIG. 10 of the attached drawings).

According to a further characteristic the first actuating lever, that is the one which is adjacent to the brake lever, is connected to the associated ratchet mechanism by means of a transverse ball joint so as not to prevent the operation of the brake lever, the said first actuating lever being biased by auxiliary resilient means against the brake lever.

According to a further characteristic of the invention, each of the two ratchet devices includes a toothed wheel connected for rotation with the gear change control shaft, a link member controlled by the said actuating lever and which is mounted freely rotatably on the control shaft and carries a toothed sector adapted to engage the toothed wheel and to cause rotation thereof following a displacement of the actuating lever, and resilient means interposed between the link member and the support body to bias the link member and consequently the actuating lever towards the respective rest position.

Thanks to these characteristics the actuation of the gear change is always easy, in that, as already indicated, the two actuating levers always return to the same position which can be reached easily by the fingers of the hand which holds the handlebar.

The indexing means associated with the control shaft comprise, in a manner known per se, a toothed wheel connected for rotation with the shaft and resiliently biased engagement means carried by the support body and adapted to engage selectively the spaces between the teeth of the toothed wheel to define the stable positions of the control shaft corresponding to the various selectable transmission ratios. The toothed wheel of the indexing means is separate from the toothed wheel of each of the two ratchet devices and can therefore be defined in an optimal manner (as opposed to what is provided in the prior document DE-A-3 136 922).

Moreover, the two ratchet devices are preferably associated with the two opposite ends of the control shaft in such a way that a first actuating lever is adjacent the brake lever, whilst the second actuating lever is adjacent the handlebar and is easily reachable by the thumb.

Moreover, the member around which the gear change control cable passes is disposed solely at one end of the control shaft adjacent the handlebar so that the section of cable projecting from the support body can be guided parallel to and adjacent the tube constituting the handlebar.

A further characteristic of the invention lies in the fact that the two actuating levers of the ratchet devices are guided through slots in the support body having an extent sufficient to allow the displacement of each actuating lever to cause the successive selection of several ratios.

In other words, with the device according to the invention it is possible to control the passage from one transmission ratio to a ratio which is not that immediately adjacent thereto with a single movement of the respective actuating lever.

BRIEF DESCRIPTION OF THE DRAWINGS

Further characteristics and advantages of the present invention will become apparent from the following description with reference to the attached drawings provided purely by way of non limitative example, in which:

FIG. 6 is a sectional view taken on the line VI—VI of FIG. 1;

FIG. 7 is a sectional view taken on the line VII—VII of FIG. 1;

FIG. 8 is a sectional view taken on the line VIII—VIII of FIG. 3;

FIG. 9 is a sectional view taken on the line IX—IX of FIG. 1; and

FIG. 10 is a schematic perspective view which illustrates the use of the control unit of the invention.

FIG. 11 is an enlarged detailed view of the tang shown in FIG. 1.

DETAILED DESCRIPTION OF THE INVENTION

Figure 1:
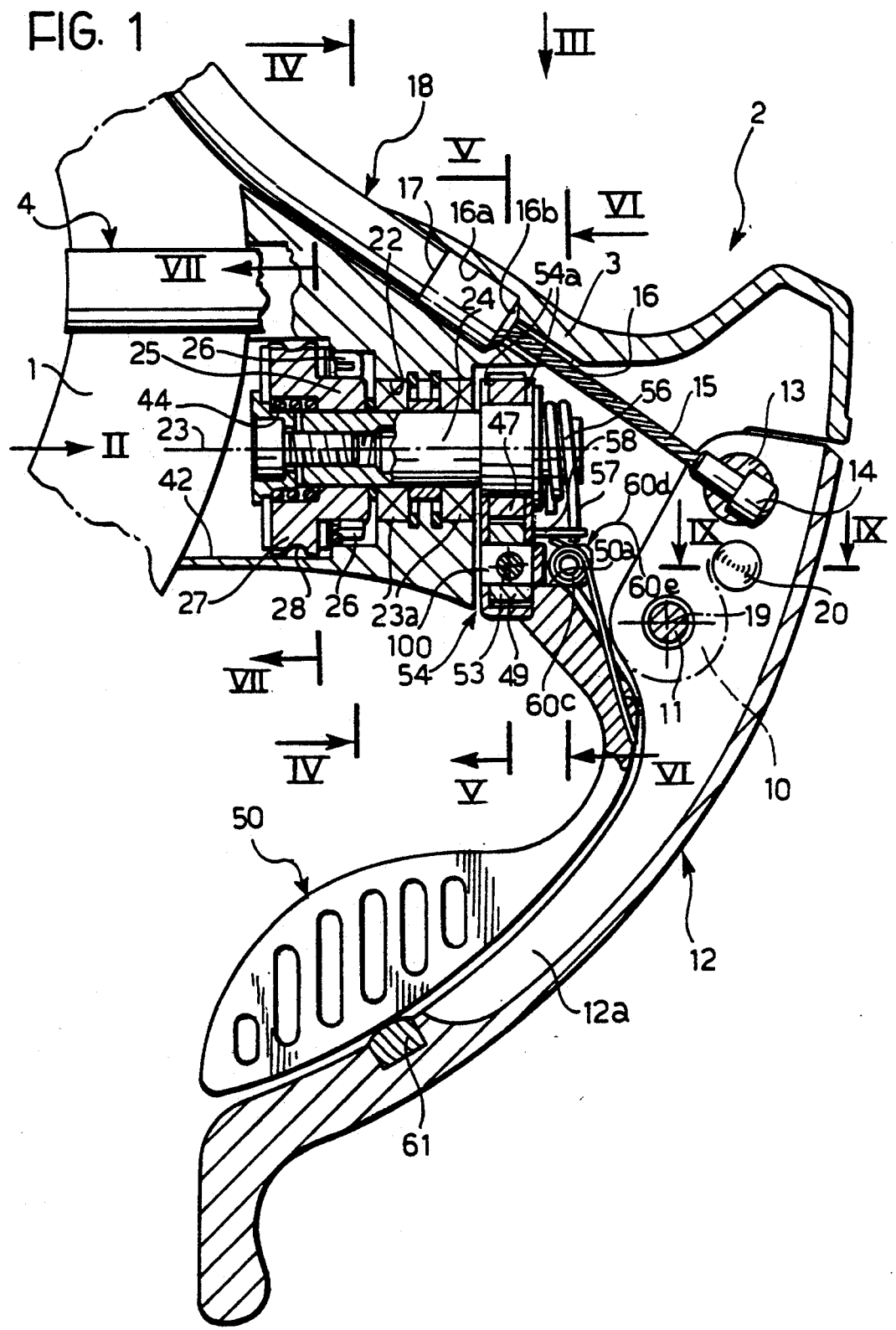
FIG. 1 is a sectional view of a preferred embodiment of the control unit according to the invention.

With reference to FIGS. 1 and 10, the reference 1 generally indicates a competition bicycle handlebar which is provided, at least at one end with a control unit according to the invention. The unit according to the invention is a combined brake and gear change unit for a bicycle. It is therefore utilised for controlling the brake associated with one of the two bicycle wheels, and the rear dérailleur which controls the selective engagement of the bicycle chain with the sprockets on the hub of the bicycle's rear wheel. Naturally, if there is provided a second analogous unit at the other end of the handlebar, this latter will control the brake of the other wheel of the bicycle and the front dérailleur which controls the selective engagement of the bicycle chain with the gears on the chain wheel.

Figure 3:
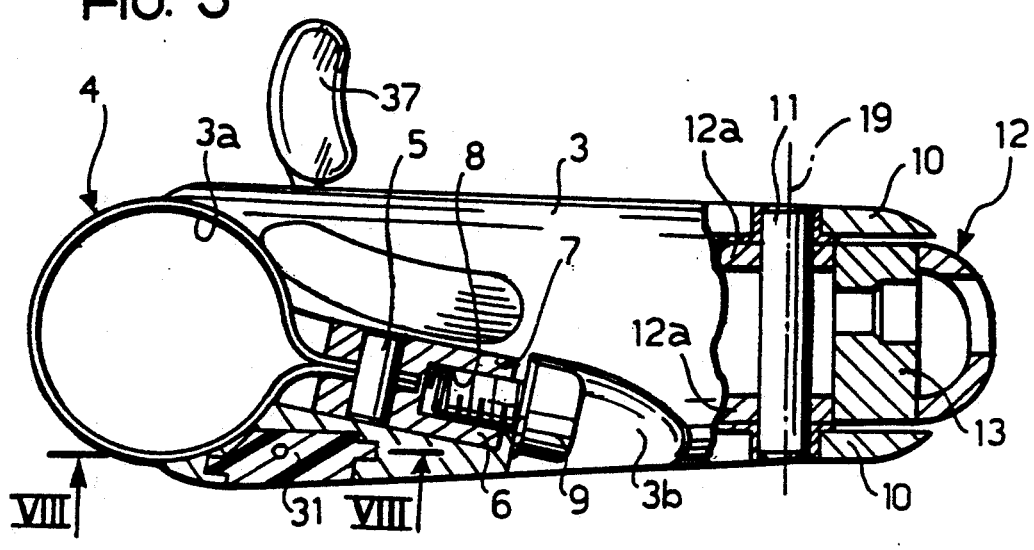
FIG. 3 is view in the direction of the arrow III—III of FIG. 1.

With specific reference to FIG. 1, the unit according to the invention, which is generally indicated with the reference 2, comprises a support body 3 preferably made of light alloy, which is fixed in a known manner to the handlebar 1 by means of a clamp band 4. As illustrated in FIG. 3, the device 4 comprises a flat metal band having juxtaposed ends fixed by means of a cylindrical pin 5 to an element 6 which is received slidably in a cylindrical cavity 7 of the support body 3 which opens onto the concave surface 3a of the body 3 which fits against the handle bar 1. The element 6 has a blind threaded hole 8 for engagement of the screw 9 the head of which is received within a cavity 3b of the body 3 (see also FIG. 5) and defines a polygonal socket for insertion of a manipulation tool. Clamping of the screw 9 causes clamping of the surface 3a of the body 3 against the band and against the handle bar 1.

Still with reference to FIG. 1, the support body 3 has, in a known way, in its frontal part, two lateral cheeks 10 (see also FIG. 3) to which are connected the ends of a pin 11 for pivoting a brake control lever 12. The lever 12 is also preferably made of a light alloy and has a substantially U-shaped transverse section with two lateral cheeks 12a which are engaged by the pivot pin 11 (FIG. 3). The two cheeks 12a also support a small block 13 to which is fixed, in a known way, the end 14 of a flexible metal brake control cable 15. The cable 15 projects out from the support body 3 passing through a hole 16 formed in the upper wall of the support body and having a widened section 16a on the bottom wall 16b of which engages the end 17 of a sheath 18 which is associated with the flexible cable 15. The section of the sheath 18 which projects from the support body 3 is held in a seat 18a of the body 3 and is guided parallel to and adjacent the handlebar tube.

In normal conditions of use of the bicycle the axis 19 of the pivot pin of the brake control lever 12 lies horizontally and transversely with respect to the longitudinal plane of the bicycle.

The cable 15 is subjected to a biasing action caused by a spring associated with the brake device in such a way that it tends to cause the lever 12 to rotate about the associated axis 19 in an anticlockwise direction (with reference to FIG. 1). The lever 12 is also provided with a stop pin 20 (see FIG. 9) retractable within the lever against the action of a spring 21, which is adapted to engage the edge of one of the two cheeks 10 of the support body 3 so as to define the rest position of the lever. Starting from this position, the lever can be turned in a clockwise sense (still with reference to the FIG. 1) so as to apply a tension to the cable 15 and therefore control braking.

Figure 2:
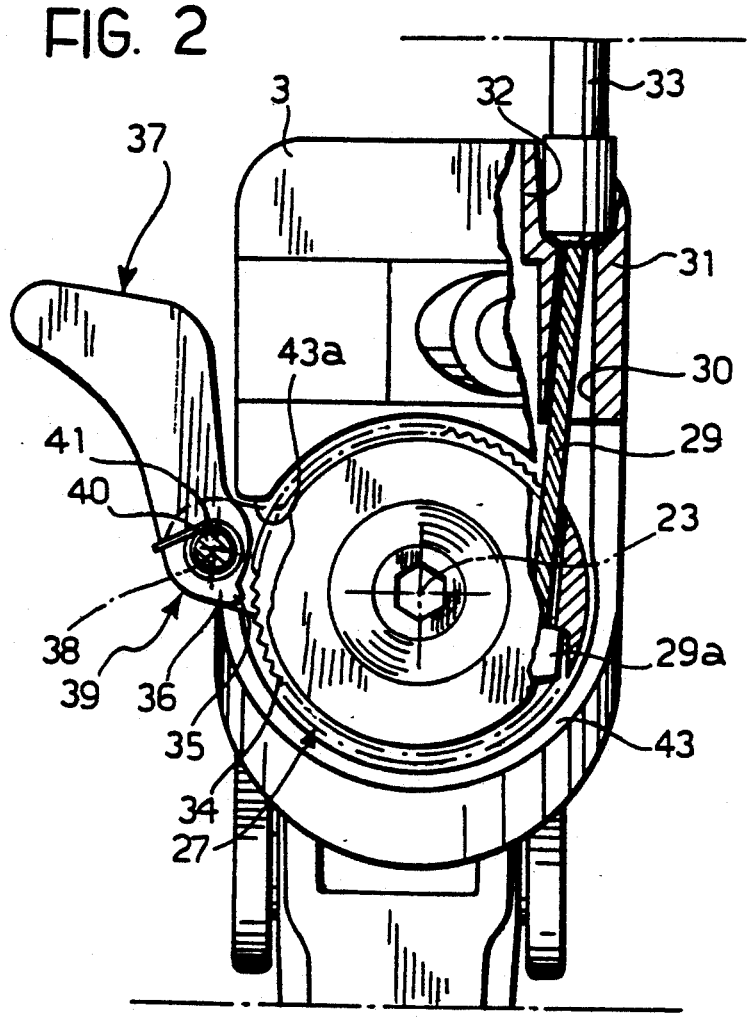
FIG. 2 is a view seen in the direction of the arrows II—II of FIG. 1 of the unit according to the invention, seen dismantled from the bicycle handlebar.
Figure 4:
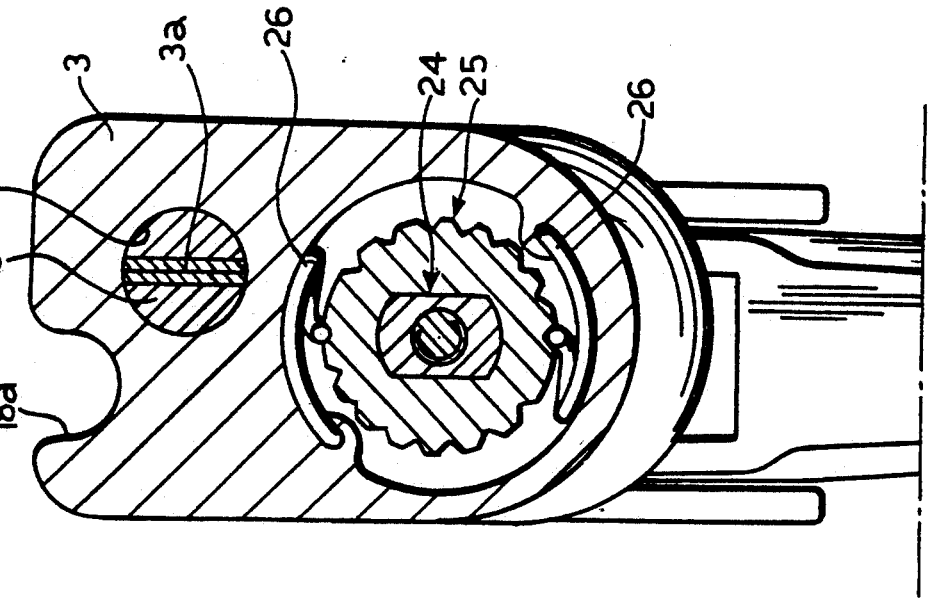
FIG. 4 is a sectional view taken on the line IV—IV of FIG. 1.

The support body 3 has a cylindrical hole 22 the axis 23 of which is orthogonal to the pivot axis 19 of the brake lever 12 and parallel to the longitudinal direction of the bicycle to which the unit is mounted. Within the hole 22 is rotatably mounted, by means of two rolling element bearings 23a, a shaft 24 for controlling the bicycle gear change. The shaft 24 has a portion with a non-circular section on which is fitted a toothed wheel 25 cooperating with two wire springs 26 (see FIG. 4) each of which has one end fixed to the support body 3 and the opposite end in resilient engagement with a space between teeth in the toothed surface of the wheel 25. The toothed wheel 25 and the two wire springs 26 cooperate together to constitute indexing means adapted to define a plurality of stable positions of the control shaft 24 corresponding to the engagement of the various selectable transmission ratios of the gear change. The wheel 25 is formed integrally and connected to a further wheel 27 (FIG. 1) having a peripheral groove 28, around which a flexible control cable 29 of the gear change is passed (FIG. 2). The flexible cable 29 has an end 29a received in a corresponding seat formed in the wheel 27 and is guided through the hole 30 of an insert 31 of plastics material (FIGS. 2, 3, 8) which is fixed in a seat 33 of the body 3. The cable 29 has a sheath 32 the end of which is engaged against the wall of an enlarged portion of the hole 30.

The wheel 27 has, as well as the peripheral groove 28, a peripheral set of axially extending teeth 34 (FIG. 2) cooperating in the manner of a ratchet with the teeth 35 of an engagement member 36 constituted by one end of an actuating lever 37. The lever 37 is articulated at 38 to a link member constituted by a pair of plates 39 which are freely rotatably mounted on the assembly constituted by the wheels 25, 27 and which support a pin 40 for pivoting of the actuating lever 37. The pin 40 has a wire spring 41 (FIG. 2) associated therewith, which is interposed between the actuating lever 37 and one of the two plates 39 and tends to maintain the lever 37 in the rest position illustrated in FIG. 2, in which the tooth 35 is spaced from the teeth 34 of the wheel 27. The two plates 39 have a disc part which, as already indicated, is freely rotatably mounted on the wheels 25, 27 and is disposed within a cavity 42 of the support body 3. The pivot pin 40 of the actuating lever 37 is supported by respective radial projections of the plates 39 which project outwardly from the support body 3 through a slot 43 (FIG. 2). Normally, the two plates 39, and consequently the actuating lever 37, are maintained in the rest position illustrated in FIG. 2 in which the plates 39 are in contact against one end 43a of the slot 43, by a coil spring 44 mounted coaxially between the shaft 24 and the wheel 27 and having one end anchored to one of the two plates 39 and the other end, indicated 45 in FIG. 7, anchored in a seat of the support body 3. The wheel 27 has a sector-shaped groove 46 which avoids interference between the wheel 27 and the end 45 during rotation of the wheel 27. The spring 44 biases the two plates 39 towards the rest position illustrated in FIG. 2.

When the cyclist wishes to control a downward selection of the gear transmission ratio he acts with the thumb of the hand which holds the handlebar on the actuating lever 37 displacing it downwardly. Since the reaction of the wire spring 41 is less than that of the coil spring 44 the movement of the lever 37 takes place initially without transmitting any movement to the two plates 39.

The free movement of the lever 37 proceeds until the tooth 35 engages the tooth 34 of the wheel 27. Starting from this moment, further movement of the lever 37 also causes a rotation of the wheel 27 and consequently the passage from the previously engaged transmission ratio to the adjacent ratio or even to a further adjacent transmission ratio. The passage through each transmission ratio is clearly felt by the cyclist following the snap engagement of the spring 26 in the spaces of the toothed wheel 25. The length of the slot 43 (FIG. 2) is such that the two plates 39 can perform an angular movement sufficient to cause the passage through more than one transmission ratio with a single actuation of the lever 37. When the action on the lever is interrupted, the assembly constituted by the lever and the two plates 39 returns to the rest position illustrated in FIG. 2 by the bias exerted by the springs 41 and 44. Therefore, the cyclist's thumb will again find the lever in its rest position easily reachable when it again becomes necessary to control another gear change movement.

As is evident from the preceding description and from the attached drawings, the wheel 27 is mounted on the end of the shaft 24 which is adjacent to the handlebar 1. This makes it possible to dispose the section of the sheath 33 of the gear change control cable which projects from the support body 3 parallel to and adjacent the handlebar 1.

The opposite end of the control shaft 24 carries a second ratchet device of type similar to that described above. More precisely (see FIG. 1),on the shaft 24 there is fitted a tooth wheel 47 intended to cooperate in the manner of a ratchet with the teeth 48 of an engagement member 49 which is associated with one end of an actuating lever 50. More precisely, the lever 50 has a forked upper end with two arms 51 pivoted by means of a pin 52 having an axis 53 (FIGS. 1 and 5) on a tang 100 which traverses the member 49 and a link member 54 constituted by a plate folded into a U-shape in such a way as to define two wings 54a which are mounted freely rotatably on the control shaft 24. The link member 54 is biased towards a rest position (illustrated in FIG. 5) in which the lever 50 is in contact against a threaded adjustable brake 55 fixed to the body 3 by a coil spring 56 (see also FIG. 6) wound around the end of the shaft 24 and having a tail end 57 anchored to a projection 58 of the link member 54 and the other tail end 59 engaged against the support body 3. Further, the actuating lever 50 is subjected to the bias of a wire spring 60 having tail ends 60a, 60b (FIG. 6) engaged on a projection 58 of the member 54 and on the lever 50. The spring 60 is mounted on a pin 60c carried by a fork body 60d, 60e which is integrally formed with the tang 100 and tends to maintain the lever 50 in the rest position illustrated in FIG. 1, in which its surface 50a (FIG. 1) is in contact against the fork body 60d, 60e. The lever 12 is further provided with a TEFLON plug 61. The spring 60 tends to bias a rotation of the lever 50 in a transverse direction so that the teeth 48 (FIG. 5) can engage the wheel 47 only after having overcome the reaction of the spring 60. Therefore the lever 50 performs a first slack stroke to engage the teeth 48 on the wheel 47, after which a further displacement of the lever 50 causes rotation of the wheel 47 and therefore of the shaft 24.

When the cyclist wishes to actuate the gear change in a direction towards higher transmission ratios he must act on the lever 50 by pressing it transversely inwardly of the handlebar. This action is effected, as already mentioned above, against the action of the spring 60 and then against the spring 56. Following this rotation the tooth 48 engages the teeth 47 so that further action on the lever 50 causes rotation of the shaft 24 about its axis 23 and consequent tensioning of the gear change control cable 29 because it is wound over the wheel 27.

Figure 5:
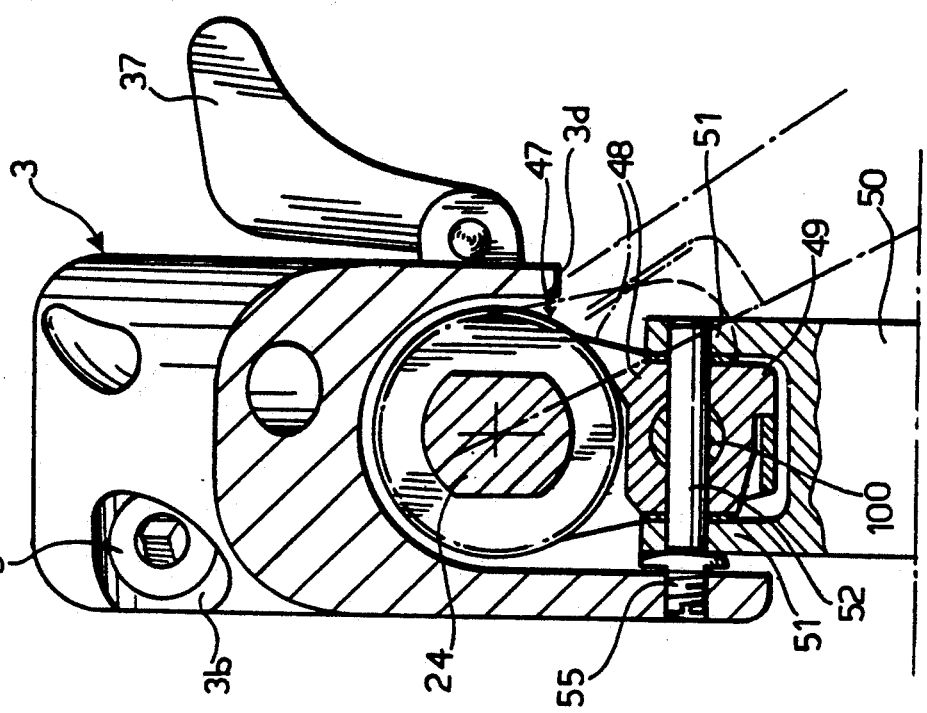
FIG. 5 is a sectional view taken on the line V—V of FIG. 1.

Lateral displacement of the lever 50 can continue until reaching the end-of-stroke position in which the lever 50 comes into engagement with a stop surface 3d (FIG. 5). This stroke is sufficient to guarantee the passage of the gear change through more than one transmission ratio. The cyclist has a precise sensation of selection of the various gear ratios following engagement of the spring 26 on the toothed wheel 25 and continues to displace the actuating lever 50 laterally until he has detected the desired number of steps (one or two). When the desired gear is engaged the action on the lever 50 can be interrupted, after which the spring 56 causes the lever itself to be returned into its rest position illustrated in FIG. 1, where it will again easily be reachable by the cyclist's fingers of the hand which holds the handlebar when it is desired to effect a new gear change selection. The ball joint connection of the lever 50 about the axis 53 makes it possible for the lever not to interrupt the normal operation of the brake lever 12. During braking, in fact, the lever 50 is pressed rearwardly by the lever 12 and therefore rotates about the axis 53 against the action of the spring 60. When the action on the brake lever 12 is released the lever 50 returns to the forward position illustrated in FIG. 1. In any case, the fact that after each transverse action of the lever 50 this latter returns to the vertical rest position guarantees that the brake lever can also always be actuated with efficiency.

As is evident from the preceding description, the combined gear change and brake control unit of the invention has a series of advantages. First of all, it is characterised by a considerable ease of operation in that the control shaft 24 is rotatably mounted about an axis (23) which is orthogonal to the axis (19) about which the brake 12 is pivoted and which is parallel to the longitudinal direction of the bicycle. Moreover, the actuation of the gear change towards lower transmission ratios or towards higher transmission ratios is effected with two separate levers which are easily reached respectively by the thumb and by the other fingers of the hand which holds the handlebar (at the end or in correspondence with the body 3) and which are actuable with natural movements (more precisely with a downward vertical movement of the thumb and with a transverse movement inwardly of the handlebar by the other fingers). Each of the two actuating levers controls the gear change by means of a ratchet device which makes it possible to return the actuating lever automatically into its rest position once the gear change operation has been completed so as to guarantee that each actuating lever is constantly in the position which is reached most easily by the fingers of the cyclist's hand. Moreover, the ratchet devices are disposed in such a way that each actuating lever can be displaced for a sufficient distance to control, with a single movement of the lever, the passage through more than one transmission ratio. The unit further utilises indexing means which guarantees a secure snap reference of the various operating positions of the gear change. Finally, the unit has a relatively simple structure and is constituted by relatively few parts.

Naturally, the principle of the invention remaining the same, the particulars of construction and the embodiments can be widely varied with respect to what has been described and illustrated purely by way of example, without by this departing from the scope of the present invention.

What is claimed is:

1. In a combined gear change and brake unit for a bicycle, of the type comprising:
   a support body fixable to a bicycle handlebar,
   a brake control lever pivotally mounted to said support body about a first axis and provided with means for attachment of a flexible brake control cable, a gear change control member rotatably mounted on said support body about a second axis orthogonal to said first axis and carrying means about which a flexible gear change control cable is adapted to be wound, means for imparting a rotation to said gear change control member, the improvement wherein:

said unit further includes indexing means disposed in mutual engagement and carried by said gear change control member and said support body respectively, said indexing means defining a plurality of stable positions of said control member corresponding to engagement of the various selectable transmission ratios of the gear change, said control member is constituted by a gear change control shaft supported by said support body for rotation about said second axis, said means for imparting a rotation to said gear change control shaft includes two independent ratchet devices of said indexing means associated with two different portions of said gear change control shaft for actuating rotation of said shaft in opposite respective directional senses whereby to cause, respectively, upward or downward selection of the various transmission ratios, each of said ratchet devices including an actuating lever biased by resilient biasing means towards a stable rest position and displaceable against the action of said resilient biasing means to cause rotation of said control shaft; and said two actuating levers of said ratchet devices, when in their respective rest positions, extend substantially orthogonal to one another.

2. The unit of claim 1, wherein, when it is mounted on the handlebar of a bicycle said first axis thereof lies transversely of a longitudinal vertical plane of said bicycle and the second axis thereof lies parallel to the longitudinal vertical plane of said bicycle.

3. The unit of claim 1, wherein one of said two actuating levers has a rest position substantially parallel to and adjacent the brake control lever and is actuable from this position by means of a lateral pressure exerted inwardly of the handlebar, while the other actuating lever has a substantially horizontal rest position projecting towards the middle of the handlebar and is actuable from this position by means of a downward pressure.

4. The unit of claim 3, wherein the first of said actuating levers, that is to say the one which has a rest position adjacent said brake control lever, is connected to the associated ratchet device by means of a ball joint having an axis parallel to said first axis for said brake control lever and is positioned behind said brake control lever and biased against it by auxiliary resilient biasing means.

5. The unit of claim 4, wherein each of said two ratchet devices includes a toothed wheel connected for rotation with said gear change control shaft, a link member, controlled by said actuating lever, which is freely rotatably mounted on said gear change control shaft and carries a toothed sector which is adapted to engage the toothed wheel and to cause rotation thereof upon a displacement of said actuating lever, and resilient biasing means interposed between said link member and said support body to bias said link member and consequently said actuating lever towards their respective rest positions.

6. The unit of claim 5, wherein each said actuating lever is connected to the respective said link member by an articulated member and is biased by auxiliary resilient biasing means towards a rest position.

7. The unit of claim 6, wherein each of said actuating levers has a maximum possible stroke sufficient to control successive selection of more than one transmission ratio.

8. The unit of claim 7, wherein the toothed wheel of one of said two ratchet devices is mounted on an end of said control shaft which is adjacent the handlebar when the unit is assembled thereon and also defines a peripheral groove for gear change control cable to pass over.

9. The unit of claim 8, wherein the two ratchet devices are associated with two opposite ends of the gear change control shaft and the said indexing means are associated with an intermediate portion of said shaft.

* * * * *